UNITED STATES PATENT OFFICE.

LEO H. BAEKELAND, OF YONKERS, NEW YORK.

ABRASIVE COMPOSITION AND METHOD OF MAKING SAME.

942,808.  Specification of Letters Patent.  Patented Dec. 7, 1909.

No Drawing.   Application filed October 26, 1907. Serial No. 399,382.

*To all whom it may concern:*

Be it known that I, LEO H. BAEKELAND, a citizen of the United States, residing at Yonkers, in the county of Westchester and State of New York, have invented certain new and useful Improvements in Abrasive Compositions and Methods of Making Same, of which the following is a specification.

This invention relates to abrasive, grinding or polishing compositions, and the object of the invention is to provide a composition suitable for abrasive purposes or for grinding, polishing or like operations, and a method of making the same.

It is well known that abrasive or polishing materials such as carborundum, corundum, emery, sand, glass-powder, iron oxid, pumice, infusorial earth and the like, in pulverulent form, may be compounded with clay, glue, shellac, rubber, nitrocellulose, resinous bodies, etc., and formed into grinding wheels, sharpening stones and other abrasive and polishing implements. I have discovered that the infusible and insoluble condensation products of formaldehyde and phenol or its homologues, compounded with abrasive, grinding or polishing materials in a suitable state of subdivision, yield compositions possessing novel qualities of characteristics and presenting marked advantages over the abrasive compositions heretofore known. These advantages result from the physical and chemical characteristics of the composition, as well as from the simplified manufacture and low cost of the product.

My abrasive composition may be prepared as follows: Commercial phenol or its homologues, hereinafter referred to as a phenolic body, is mixed with commercial formaldehyde, usually in approximately molecular proportions. This proportion may however be considerably varied to meet particular requirements. To the formaldehyde-phenol mixture I add a suitable proportion of a pulverulent or granular abrasive or polishing material, the proportion of the latter being capable of very wide variation and depending entirely on the degree of hardness, compactness or coherence desired in the final product. The thoroughly mixed mass is now hardened by submitting it to the action of heat, either at temperatures about 100° C., or below, in which case, the hardening process is comparatively slow, or at higher temperatures, in which case, the hardening proceeds rapidly. In case higher temperatures are employed the hardening may proceed in whole or in part under the combined action of heat and increased pressure, the employment of pressure being for the purpose of preventing any lack of homogeneity or uniformity of the product due to emission of vapors with such rapidity as to cause swelling, bloating or foaming of the mass. The mass may be kept in a suitable mold during the entire hardening process, or the first stages of the hardening process may be carried out in any suitable vessel, from which the partially hardened or plastic mass may be transferred to any desired mold; or the mass may be applied as by coating or painting or otherwise to any desired surface serving as a support. During the reaction induced by the aid of heat the formaldehyde-phenol mixture changes into an infusible product insoluble in all ordinary solvents and unattacked by most chemical reagents. Its properties of withstanding high temperatures and chemical action render it most valuable for compounding with abrasive grinding and polishing materials. After the hardening process the mass may be submitted to further drying to expel any water or other volatile substances. The hardening or condensation process can be considerably accelerated by the addition of small quantities of catalytic or condensing agents, such for instance as acids, bases or salts.

During the condensation of the phenol-formaldehyde mixture to the infusible and insoluble product described a considerable quantity of water is liberated, and this may necessitate subsequent drying. Under certain conditions the liberated water may during the reaction period distribute itself unevenly throughout the mass in such manner as to impair its uniformity, and it may therefore be necessary in special cases to use anhydrous phenol and anhydrous formaldehyde, or a mixture of phenol and the polymers of formaldehyde (oxytrimethylene and paraform). The employment of these materials however involves additional expense, and I have discovered that a substantially dehydrated mixture of formaldehyde and phenol may be prepared by adding to the mixture of commercial phenol or its homologues and formaldehyde any readily water-soluble salt that possesses the property of abstracting water from the mixture. This separation of water can be effected most readily and inexpensively by the use of ordinary commercial sodium chlorid. If salt be added to a mixture of commercial formaldehyde and phenol the liquid separates into two layers; the heavier layer consists substantially of saturated brine containing small amounts of phenol, formaldehyde and other water-soluble products, while the lighter layer is of an oily character and comprises a substantially dehydrated mixture of phenol and formaldehyde or reaction products thereof. This lighter layer or oily liquid is soluble in alcohol, acetone and like solvents and is excellently adapted for the purposes of this invention, as well as for the numerous other purposes for which the hard, insoluble condensation product prepared therefrom is suitable. Or instead of adding a water-soluble salt I may heat a mixture of phenol and formaldehyde, preferably in a closed vessel or in an apparatus provided with a return condenser, until the mixture separates into two liquid layers, the one aqueous and lighter, and the other oily and heavier. The oily liquid may then be separated for use as above. Or instead of withdrawing the oily layer the mixture may be further concentrated until the water has been expelled by evaporation. In either case the addition of small amounts of catalytic or condensing agents, as above described, will be found to accelerate the first stage of the reaction. The oily liquid however obtained may now be mixed with the desired proportion of pulverulent or granular abrasive material, after which the mixture is submitted to further heating or drying, either with or without the combined action of increased pressure.

The initial condensation product above referred to as possessing the characteristics of an oily liquid may be further heated or dried before mixing with the abrasive material, and under such treatment it will acquire increased viscosity until a point is attained at which it is of a sticky, plastic or rubber-like consistence but has not yet acquired the properties of infusibility and insolubility characteristic of the final product. In this plastic condition the condensation product is capable of mixing readily with any abrasive material, and the composition formed by such mixture is ready to be subjected to further molding and hardening operations as described above.

For the purposes of this invention the partial reaction products of phenolic bodies and formaldehyde are to be regarded as equivalent to mixtures of these compounds.

In order to facilitate the mixing of the ingredients or to impart a desired color to the ultimate mass or to modify its properties in any respect, the addition of suitable proportions of other materials may be resorted to, as for instance solvents, dyes, pigments, or other solid or liquid materials.

The abrasive composition may before the final hardening be pressed or molded in suitable forms or molds, or while it is still plastic or liquid it may be applied, coated or painted on wood, paper, metals, or any other materials which it may be found advantageous to use as supports; after application to such materials it may be hardened and rendered insoluble by drying or heating as described above.

I claim:

1. The method of making an abrasive composition which consists in incorporating an abrasive material with a phenolic body and formaldehyde and transforming the same into an insoluble condensation product.

2. The method of making an abrasive composition which consists in incorporating an abrasive material with a phenolic body and formaldehyde and transforming the same into an insoluble condensation product by application of heat.

3. The method of making an abrasive composition which consists in incorporating an abrasive material with a phenolic body and formaldehyde and transforming the same into an insoluble condensation product by application of heat and pressure.

4. An abrasive or polishing composition containing an abrading or polishing agent, and an insoluble condensation product of a phenolic body and formaldehyde.

In testimony whereof, I affix my signature in presence of two witnesses.

LEO H. BAEKELAND.

Witnesses:
  Mary L. Short,
  Mary E. Scholding.